United States Patent [19]

Truc

[11] Patent Number: 6,065,234
[45] Date of Patent: May 23, 2000

[54] POST PLASTIC LENS PHOTOGRAPHIC SLIDE MOUNT

[75] Inventor: James A. Truc, Eden Prairie, Minn.

[73] Assignee: Pakon, Inc., Minnetonka, Minn.

[21] Appl. No.: 09/193,649

[22] Filed: Nov. 17, 1998

[51] Int. Cl.⁷ .................................................. A47G 1/06
[52] U.S. Cl. .............................. 40/706; 40/707; 40/709; 40/710; 40/702; 40/734
[58] Field of Search ............................ 40/706, 707, 709, 40/710, 702, 703, 705, 734

[56] References Cited

U.S. PATENT DOCUMENTS

| | | | |
|---|---|---|---|
| 3,035,364 | 5/1962 | Hoogesteger | 40/709 |
| 3,284,939 | 11/1966 | Perrot | 40/706 X |
| 4,249,328 | 2/1981 | Plumadore | 40/702 |
| 4,451,998 | 6/1984 | Philipp | 40/709 |
| 4,467,541 | 8/1984 | Pettersson | 40/706 X |
| 5,057,407 | 10/1991 | Okamura et al. | 430/531 |
| 5,364,487 | 11/1994 | Friske et al. | 156/309.9 |
| 5,392,548 | 2/1995 | Truc et al. | 40/705 |
| 5,429,700 | 7/1995 | Hudson | 40/703 X |

*Primary Examiner*—Terry Lee Melius
*Assistant Examiner*—Rodrigo J. Morales
*Attorney, Agent, or Firm*—Kinney & Lange

[57] ABSTRACT

A post plastic lens photographic slide mount made from a plastic slide mount includes a first and second plastic frame portions connected along an outer border with a pocket into which a photographic film slide can be inserted. A top plastic lens and a bottom plastic lens that can be introduced to the plastic slide mount. The plastic lenses can be added at the same time the photographic film slide is inserted into the plastic slide mount, or the lenses may be added after the plastic slide mount has been assembled. The lenses are held in place by a tongue and groove arrangement.

9 Claims, 3 Drawing Sheets

POST PLASTIC LENS PHOTOGRAPHIC SLIDE MOUNT

CROSS-REFERENCE TO RELATED APPLICATION(S)

None.

BACKGROUND OF THE INVENTION

The present invention relates to a slide mount for mounting film transparencies from a photographic film web to prepare a photographic slide. In particular the present invention allows for plastic lenses to be added to the photographic slide after it has been assembled.

Photographic film transparencies are generally severed from a photographic film web and mounted in individual slide mounts to prepare photographic slides. The photographic image of the prepared photographic slide is then viewed in cooperation with a slide projector or other visualizing means.

Plastic slide mounts, such as the Pakon slide mount sold by Pakon, Inc., are generally formed of first and second plastic frame portions connected along an outer border to form a pocket therebetween. The slide mount includes a central aperture defined by film windows formed in each of the first and second frame portions. Further, the slide mount includes a slit along the outer border which defines an insertion opening through which a photographic film transparency can be inserted into a pocket between the first and second frame portions, creating a photographic slide.

A photographic slide is susceptible to several events that can adversely affect its quality. Fingerprints or other debris can mark or scratch the film as a result of handling. In addition, when exposed to the heat of a slide projector, the film may expand and buckle, causing the projected image to go out of focus.

In response to the adverse conditions listed above, the slide mounting industry has come up with glass slide mounts. Such glass slide mounts protect the film from excessive heat and serve to keep the film flat and thus the projected image in focus. In addition, glass slide mounts protect the film from fingerprints or other debris that could mark or destroy the film. A major problem with glass film mounts, however, has been that they are expensive and very slow to assemble. At present, glass lenses are added to a slide mount by hand. Another problem is assuring the film and mount are cleaned before the glass lenses are added to the slide mount so that dust or other particles do not get trapped between the film and lenses.

Thus there has been a continuing need for a slide mount system that manifests the benefits of glass mounts, i.e., holding the film flat when exposed to heat and protecting the film from fingerprints and other debris, while at the same time allowing for assembly in an inexpensive, quick manner that allows for the film and slide mount to be cleaned before the lenses are added.

BRIEF SUMMARY OF THE INVENTION

The present invention offers an inexpensive and quick manner of adding slide mount lenses after a photographic slide has been assembled. The post plastic lens slide mount begins with a plastic slide mount in which the photographic film slide has been mounted. The plastic slide mount is made from plastic that is sufficiently flexible to allow the slide mount to be pried apart slightly so that a photographic film slide can then be introduced. This slide mount has a central aperture through which the mounted photographic film is then visible.

While there are many ways to hold the lenses in the slide mount, in one preferred embodiment, the central aperture has a shaped inner edge. This shaped inner edge allows for a plastic lens to be introduced and held in the slide mount. The plastic lens has a correspondingly shaped edge which allows it to mate with the inner edge of the central aperture of the slide mount, thus holding the plastic lens in place. In this manner, both a top lens and a bottom lens can be added to the slide mount, thus protecting the photographic film. In creating the post plastic lens slide mount, film is loaded into the slide mount to prepare a photographic film slide. The mount and the film are then cleaned using air pressure. Top and bottom plastic lenses are likewise cleaned using air pressure, and are then inserted into the plastic slide mount. It is possible to mount these plastic lenses at the same time the plastic slide mount is being assembled, or the plastic lenses can be mounted into the slide after the film has been inserted. In other words, a consumer can choose to have the plastic lenses added to the mounts when the consumer gets the slides made, or the consumer can wait and add the lenses at a later time.

DETAILED DESCRIPTION

Figure 1:
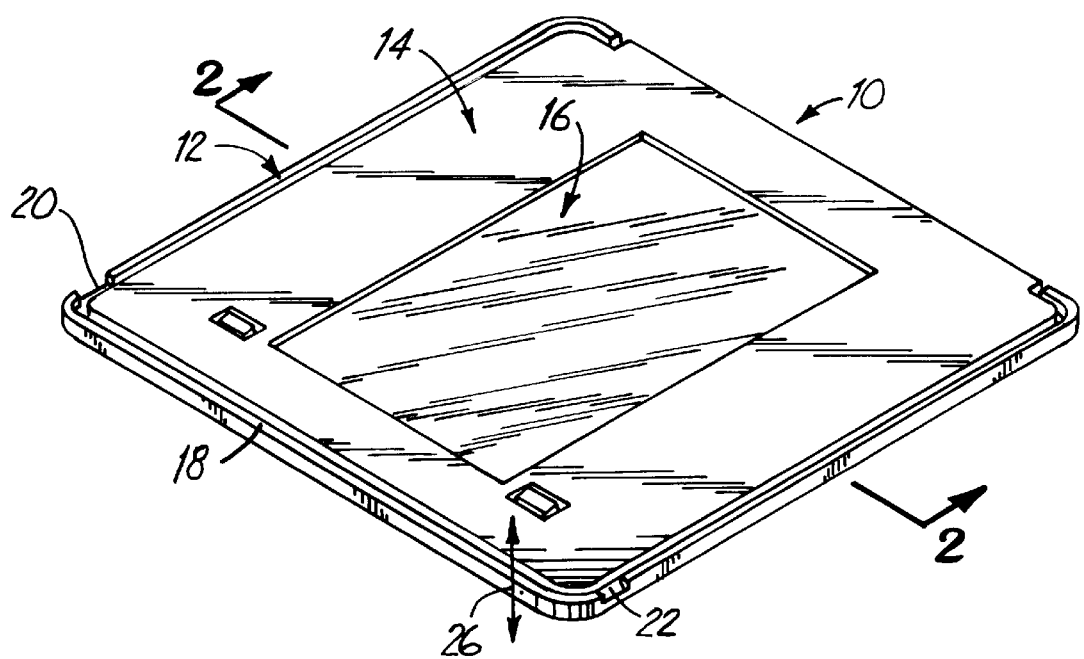
FIG. 1 is an enlarged perspective view of a slide mount of the present invention.

FIG. 1 is a perspective view of a slide mount 10 of the present invention. The slide mount 10 is formed of a first frame portion 12 and a second frame portion 14 and includes a central aperture 16 and a slit 18. The slit 18 allows for a film transparency to be slidably introduced into the slide mount 10. This is achieved by applying a separating force to opposing camming surfaces 20 and 22, as illustrated by arrow 26, to separate the first and second frame portions 12 and 14. The first and second frame portions 12 and 14 are formed of a resilient plastic material that allows them to be flexed apart when the separating force is applied at camming surfaces 20 and 22. When this separating force is released after a film transparency is inserted, the first and second frame portions 12 and 14 close to form the photographic slide mount.

The first and second frame portions 12 and 14 each have a film window that together create a central aperture 16 when the slide mount 10 is assembled. An image on a film transparency becomes visible through this central aperture 16. It is this central aperture 16 to which post mount plastic lenses are added.

Figure 2:
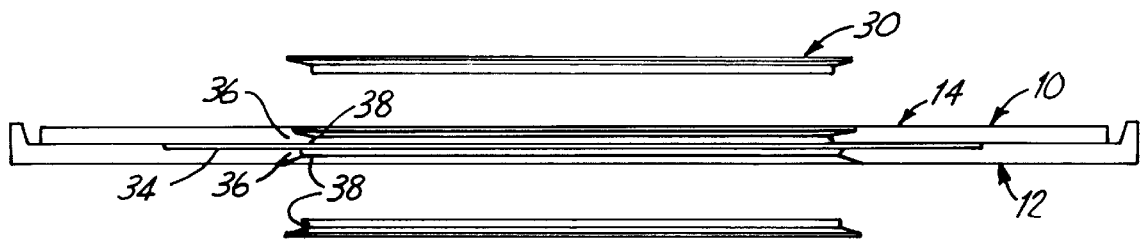
FIG. 2 is an exploded side cross sectional view of the plastic lenses and the modified mount taken along cut line 2—2 of FIG. 1.

FIG. 2 is an exploded cross-sectional view taken along line 2—2 of FIG. 1. FIG. 2 shows a top lens 30 which can be introduced into the second frame portion 14. Also shown is a bottom lens 32 which can be introduced into the first frame portion 12. The top and bottom lenses 30 and 32 may be coated with a scratch resistant material so that the lenses 30 and 32, even when exposed to other surfaces, remain transparent and free of scratches or mars. Likewise the lenses 30 and 32 may consist of an antihalation surface to eliminate newton rings and improve the ability to view the film transparency.

The lenses can be held in the slide mount in a variety of ways. For instance, a layer of adhesive can be used to hold the lens and slide mount together. Similarly, the lenses can be held in place with a series of pins and holes or notches. Any method used must result in the outer surfaces of the lenses being essentially flush with the top and bottom surfaces of the slide mount frame portions such that the finished slide can still be used in standard slide projectors and slide holders.

Figure 3:
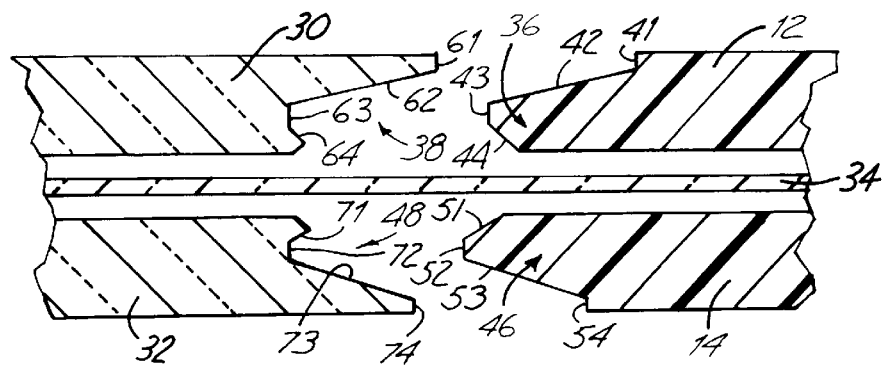
FIG. 3 is an exploded cross sectional view of a portion of the slide mount and top and bottom lenses.
Figure 4:
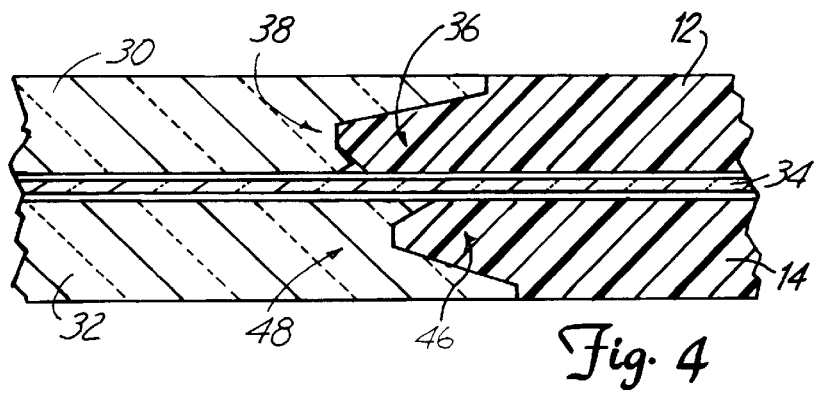
FIG. 4 is a cross sectional view of a portion of the post plastic lens slide mount.

In one embodiment, the top lens 30 and bottom lens 32 are held in place because the inner edges of the first and second frame portions 12 and 14 are shaped such that a tongue 36 mates with the shaped outer edges of the lenses 30 and 32 at groove 38. FIGS. 3 and 4 show an exploded side view of a portion of the lens mount along with this tongue and groove system. FIG. 3 shows that the slide mount tongue 36 on first frame portion 12 is made up of a first vertical mount surface 41, a top sloped mount surface 42, a second vertical mount surface 43, and a bottom sloped mount surface 44. Similarly, the slide mount tongue 46 on second frame portion 14 has a top sloped mount surface 51, a first vertical mount surface 52, a bottom sloped mount surface 53, and a second vertical mount surface 54. The lens groove 38 on top lens 30 is made up of a first vertical lens surface 61, a top sloped lens surface 62, a second vertical lens surface 63, and a bottom sloped lens surface 64. Likewise, the lens groove 48 on bottom lens 32 has a top sloped lens surface 71, a first vertical lens surface 72, a bottom sloped lens surface 73, and a second vertical lens surface 74. The slide mount tongues 36 and 46 continue around the entire outer edges of the lenses 30 and 32. In like manner, the lens grooves 38 and 48 continue around the entire inner edges of the central aperture 16 of both the first and second frame portions 12 and 14.

FIG. 4 shows how, once introduced, the mount tongue 36 and lens groove 38 fit together. The lens grooves 38 and 48 are coupled with the mount tongues 36 and 46 such that the vertical and sloped surfaces of the lenses fit snugly against the vertical and sloped surfaces of the mount. This coupling can be achieved by applying a force to the lenses 30 and 32 until they snap into place in the slide mount 10. The film 34 fits between the top plastic lens 30 now coupled with the top mount surface 12 and the bottom plastic lens 32 now coupled with the second frame portion 14 leaving room for the film to expand and contract as it is exposed to heat.

Figure 5:
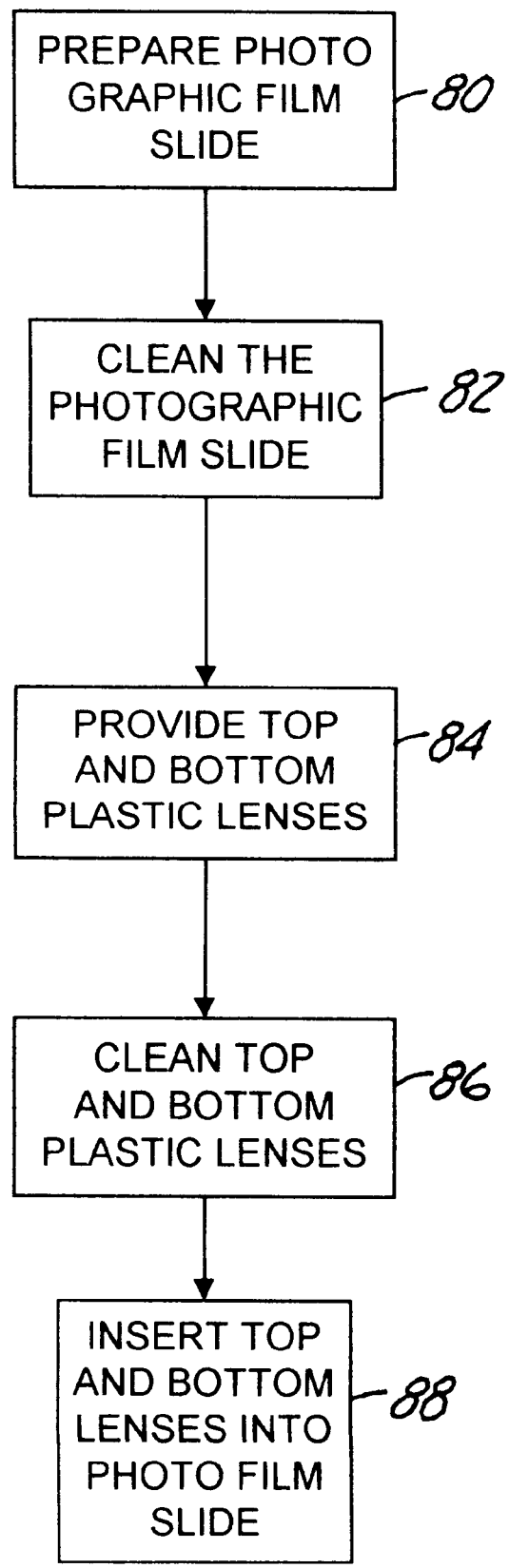
FIG. 5 is a flow diagram showing the process of making a post plastic lens photographic slide mount.

FIG. 5 is a flow diagram setting out the process for fitting a plastic slide mount with plastic lenses. First step 80 is to prepare a photographic film slide by loading a film into a slide mount. As previously explained, this can be done by applying a separating force to opposing camming surfaces 20 and 22 shown on FIG. 1, sliding a film into the resulting opening, and then releasing the force.

Second step 82 is to clean the combined mount and film by using anti-static air pressure to remove any dust or debris. Cleaning by anti-static air pressure is a practice well known to those skilled in the art. Third step 84 is to provide top and bottom plastic lenses. In fourth step 86, the top and bottom plastic lenses are also cleaned by using anti-static air pressure. The fifth step 88 is to insert the top and bottom plastic lenses into the slide mount. As mentioned, this can be achieved in several ways. In a preferred embodiment, the lenses are inserted by applying a force to the lens until it snaps into the slide mount. The lens remains inserted in the slide mount because, as previously described, the lenses are coupled with the slide mount using a tongue and groove arrangement running around the central aperture 16.

Although the present invention has been described with reference to preferred embodiments, workers skilled in the art will recognize that changes may be made in form and detail without departing from the spirit and scope of the invention.

What is claimed:

1. A slide mount comprising:

a slide mount frame formed of first and second frame portions connected along an outer border to form a pocket and leaving a slit through which a film transparency can be slidably introduced to prepare a photographic film slide, the first and second frame portions having rectangular film windows defining a central aperture the slide mount frame having first and second outer surfaces;

a top plastic lens having an outer surface inserted into the film window of the first frame portion;

a bottom plastic lens having an outer surface inserted into the film window of the second frame portion; and means for holding the top plastic lens and bottom plastic lens in engagement with the first and second frame portions, respectively, of the slide mount so that the outer surface of the top plastic lens is essentially flush with the first outer surface of the slide mount frame and the outer surface of the bottom plastic lens is essentially flush with the second outer surface of the slide mount frame.

2. The slide mount of claim 1 wherein the means for holding the top and bottom plastic lenses in engagement with the first and second frame portions, respectively, of the slide mount comprises an adhesive.

3. The slide mount of claim 1 wherein the means for holding the top and bottom plastic lenses in engagement with the first and second frame portions, respectively, of the slide mount comprises tongue and groove connections.

4. The slide mount of claim 1 wherein the top and bottom plastic lenses are coated with a scratch resistant material.

5. The slide mount of claim 1 wherein the plastic lenses include an antihalation surface to eliminate newton rings.

6. A slide mount comprising:

a slide mount formed of a first and second frame portion connected along an outer border to form a pocket and leaving a slit through which a film transparency can be slidably introduced to prepare a photographic film slide, the first and second frame portions having rectangular film windows defining a central aperture, the rectangular film windows of the first and second frame portions having a shaped inner edge, the slide mount having first and second outer surfaces;

a top plastic lens having an outer surface inserted into the film window of the first frame portion the top plastic lens having a shaped outer edge which mates with the shaped inner edge of the film window of the first frame portion;

a bottom plastic lens having an outer surface inserted into the film window of the second frame portion, the bottom plastic lens having a shaped outer edge which mates with the shaped inner edge of the film window of the second frame portion, wherein the outer surface of the top plastic lens is essentially flush with the first outer surface of the slide mount, and the outer surface of the bottom plastic lens is essentially flush with the second outer surface of the slide mount.

7. The slide mount of claim 6 wherein the top and bottom plastic lenses are coated with a scratch resistant material.

8. The slide mount of claim 6 wherein the plastic lenses include an antihalation surface to eliminate newton rings.

9. The slide mount of claim 6 wherein the shaped inner edge of the rectangular film windows of the first and second frame portions is tongued and the shaped outer edge of the top and bottom plastic lenses is grooved.

* * * * *